US012802422B2

(12) United States Patent
Kim et al.

(10) Patent No.: US 12,802,422 B2
(45) Date of Patent: Nov. 17, 2026

(54) METHOD AND SYSTEM FOR FUSING VISUAL FEATURE AND LINGUISTIC FEATURE USING ITERATIVE PROPAGATION

(71) Applicant: ELECTRONICS AND TELECOMMUNICATIONS RESEARCH INSTITUTE, Daejeon (KR)

(72) Inventors: Jonghee Kim, Daejeon (KR); Jin Young Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 18/610,617

(22) Filed: Mar. 20, 2024

(65) Prior Publication Data

US 2024/0320963 A1 Sep. 26, 2024

(30) Foreign Application Priority Data

Mar. 22, 2023 (KR) ........................ 10-2023-0037178

(51) Int. Cl.
*G06V 10/80* (2022.01)
*G06V 10/44* (2022.01)

(52) U.S. Cl.
CPC ............ *G06V 10/806* (2022.01); *G06V 10/44* (2022.01)

(58) Field of Classification Search
CPC ...... G06V 10/806; G06V 10/44; G06V 10/82; G06F 18/253; G06F 3/048; G06F 16/732; G06N 3/0455
See application file for complete search history.

(56) References Cited

U.S. PATENT DOCUMENTS

| | | | | |
|---|---|---|---|---|
| 11,409,791 | B2 | 8/2022 | Torabi et al. | |
| 11,487,999 | B2 | 11/2022 | Le et al. | |
| 12,361,732 | B2 * | 7/2025 | Chiu | G06V 10/774 |
| 12,518,512 | B2 * | 1/2026 | Yuan | G06V 10/774 |
| 2012/0117090 | A1 | 5/2012 | Lee et al. | |
| 2019/0295302 | A1 * | 9/2019 | Fu | G06V 10/82 |
| 2019/0341025 | A1 * | 11/2019 | Omote | G10L 25/30 |
| 2022/0004773 | A1 | 1/2022 | Son et al. | |
| 2023/0260164 | A1 * | 8/2023 | Yuan | G06N 3/0895 382/157 |
| 2024/0169624 | A1 * | 5/2024 | Brandt | G06T 11/60 |
| 2025/0104453 | A1 * | 3/2025 | Mao | G06F 18/253 |
| 2026/0094327 | A1 * | 4/2026 | Cohen | G06F 16/783 |

FOREIGN PATENT DOCUMENTS

| | | | | |
|---|---|---|---|---|
| KR | 10-2022-0013164 A | | 2/2022 | |
| WO | WO-2024005784 A1 | * | 1/2024 | G06V 20/46 |

* cited by examiner

*Primary Examiner* — Oneal R Mistry
(74) *Attorney, Agent, or Firm* — LRK PATENT LAW FIRM

(57) ABSTRACT

The present invention relates to a visual-linguistic feature fusion method and system. The visual-linguistic feature fusion method includes generating a linguistic feature using a text encoder based on text, generating a visual feature using a video encoder based on a video frame, and generating a fused feature of the linguistic feature and the visual feature using an attention technique based on the linguistic feature and the visual feature.

10 Claims, 8 Drawing Sheets

METHOD AND SYSTEM FOR FUSING VISUAL FEATURE AND LINGUISTIC FEATURE USING ITERATIVE PROPAGATION

CROSS-REFERENCE TO RELATED APPLICATION

This application claims priority to and the benefit of Korean Patent Application No. 10-2023-0037178, filed on Mar. 22, 2023, the disclosure of which is incorporated herein by reference in its entirety.

BACKGROUND

1. Field of the Invention

The present invention relates to a video processing method and system using artificial intelligence. More particularly, the present invention relates to a method and system for fusing a linguistic feature extracted from a natural language sentence and a visual feature extracted from a video.

2. Description of Related Art

Feature fusion techniques are effective in obtaining useful results in video search or video question answering. For example, fused feature embeddings can be input into a neural network, and its output can be used to obtain video search results or responses to video queries. When applying the feature fusion techniques to the video search or the video question answering, the fusion of visual features and linguistic features has been mainly used.

There are two representative methods of fusing visual features and linguistic features.

The first method is a method of generating weights corresponding to each visual features using linguistic features and multiplying the weights by the visual features. This method also fuses features during the generation of the weights, but mainly uses results obtained by multiplying the weights to select which visual features are important, and therefore, has a limitation that feature fusion is performed in a restricted manner.

The second method, mainly used with a transformer, is a method of simply concatenating visual features and sentence features and viewing the connected features as a single sequence on which self-attention is performed. In this case, since the computation cost of the self-attention is proportional to the square of the sequence length, that is, the square of the length of the video, the second method is not efficient in processing long videos.

SUMMARY OF THE INVENTION

The present invention is directed to providing a feature fusion method and system that effectively fuses a visual feature and a linguistic feature through iterative propagation using cross-attention and self-attention in order to efficiently perform feature fusion for long videos.

An object of the present invention is not limited to the above-described aspect, and other objects that are not described may be obviously understood by those skilled in the art from the following specification.

According to an aspect of the present invention, there is provided a visual-linguistic feature fusion method, including: generating a linguistic feature using a text encoder based on text; generating a visual feature using a video encoder based on a video frame; and generating a fused feature of the linguistic feature and the visual feature using an attention technique based on the linguistic feature and the visual feature.

The attention technique may include cross-attention.

The attention technique may include cross-attention and self-attention.

The generating of the fused feature may include generating a new fused feature using the attention technique based on the fused feature.

The fused feature may include the linguistic feature generated by propagating the visual feature to the linguistic feature and the visual feature generated by propagating the linguistic feature to the visual feature.

In the generating of the fused feature, the cross-attention may be performed after setting one of the linguistic feature and the visual feature as a giving feature, setting the other feature as a receiving feature, setting the receiving feature as a query of the cross-attention, and setting the giving feature as a key and a value of the cross-attention.

In the generating of the fused feature, the fused feature may be generated by computing an inner product of the query and the key, inputting this into a Softmax function to calculate a weight, multiplying the calculated weight by the value, and then adding the value multiplied by the weight to the receiving feature.

According to another aspect of the present invention, there is provided a visual-linguistic feature fusion system, including: a memory configured to store computer-readable instructions; and at least one processor configured to execute the instructions.

The at least one processor may be configured to execute the instructions to generate a linguistic feature using a text encoder based on text, generate a visual feature using a video encoder based on a video frame, and generate a fused feature using an attention technique based on the linguistic feature and the visual feature.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
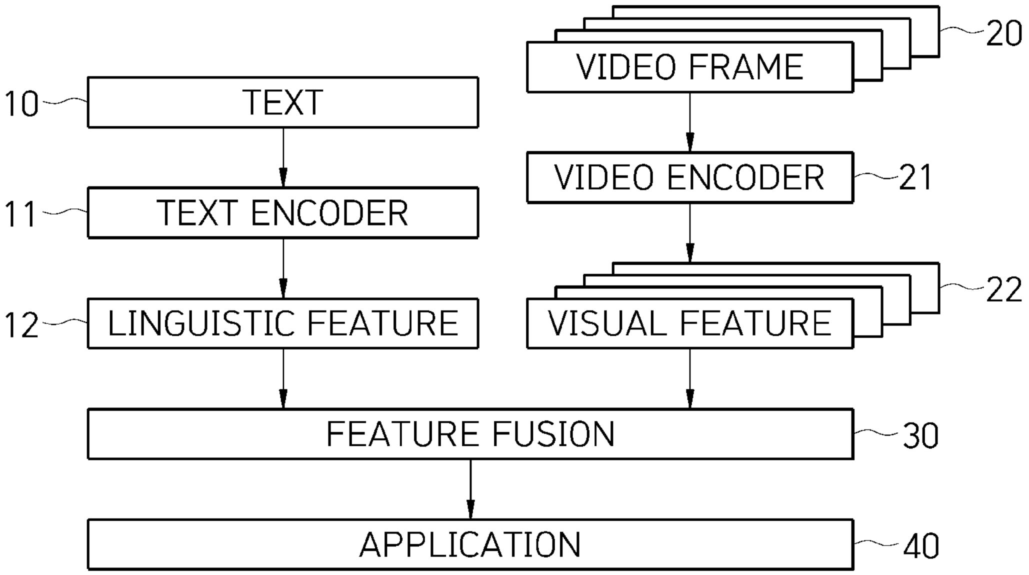
FIGS. 1A and 1B are diagrams for describing a procedure of visual-linguistic feature fusion according to an embodiment of the present invention.

The present invention relates to a method (hereinafter, referred to as "visual-linguistic feature fusion method") and system (hereinafter, referred to as "visual-linguistic feature fusion system") for fusing a visual feature and a linguistic feature using iterative propagation. The visual-linguistic feature fusion method and system proposed in the present invention may be used in various applications that utilize vision and language, such as sentence-based video search and video question answering using a video and a natural language sentence as input. That is, based on the visual-linguistic feature fusion method and system according to the present invention, the system such as the sentence-based video search and the video question answering that fuse the visual and linguistic features for inference may be constructed.

Various advantages and features of the present invention and methods accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. "Comprise" and/or "comprising" used in the present invention indicate(s) the presence of stated components, steps, operations, and/or elements but do(es) not exclude the presence or addition of one or more other components, steps, operations, and/or elements.

When it is decided that the detailed description of the known art related to the present invention may unnecessary obscure the gist of the present invention, a detailed description therefor will be omitted.

Hereinafter, embodiments of the present disclosure will be described in detail with reference to the accompanying drawings. The same means will be denoted by the same reference numerals throughout the accompanying drawings in order to facilitate the general understanding of the present invention in describing the present invention.

Figure 1B:
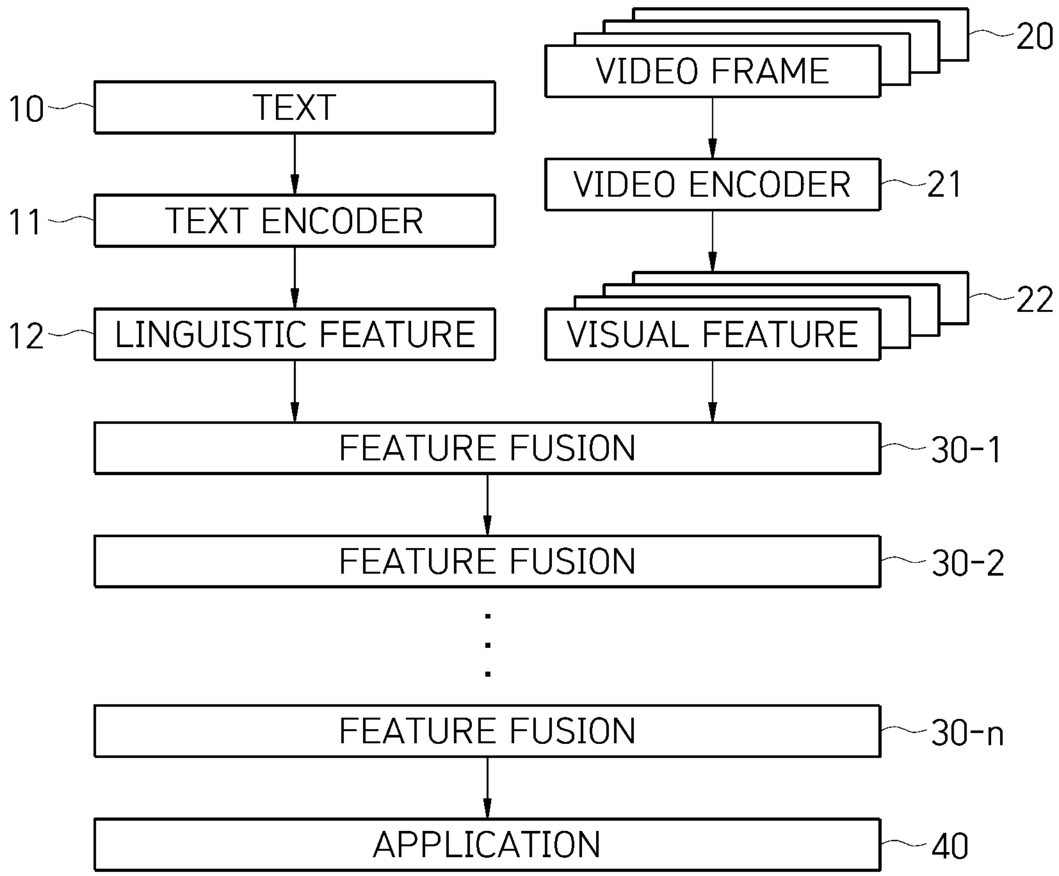

FIGS. 1A and 1B are diagrams for describing a procedure of visual-linguistic feature fusion according to an embodiment of the present invention.

Text 10 and a video frame 20 are used as inputs to the visual-linguistic feature fusion method and system 1000 according to the embodiment of the present invention. The text encoder 11 generates a linguistic feature 12 based on the text 10. The video encoder 21 generates a visual feature 22 based on the video frame 20. The linguistic feature 12 and the visual feature 22 may take the form of an embedding vector. For example, the linguistic feature 12 may be a sentence feature extracted from a sentence. For example, the visual feature 22 may be a frame feature extracted from a plurality of frames sampled from a video.

As illustrated in FIGS. 1A and 1, the linguistic feature 12 and the visual feature 22 are mutually propagated through feature fusion 30, and results (features fused through the mutual propagation) of the feature fusion 30 may be used as input to the application 40. For example, the application 40 may be a video search application or a video question answering application. The application 40 may convert the features fused through the feature fusion 30 using a neural network, and perform the video search or video question answering based on the conversion results.

As illustrated in FIG. 1A, the visual-linguistic feature fusion method and system 1000 may perform the feature fusion 30 only once. However, in order to obtain excellent video search results or video question answering results, the feature fusion 30 as illustrated in FIG. 1B is preferably performed repeatedly two or more times. Since the present invention uses cross-attention (CA) in the feature propagation process during the feature fusion 30, the computation cost and computation time may be reduced compared to the existing feature fusion techniques even if feature fusion 30 is performed multiple times.

In the case of the visual-linguistic feature fusion method and system 1000 according to the embodiment of FIG. 1B, the linguistic feature 12 and the visual feature 22 are fused through n feature fusions 30-1, 30-2, . . . , **30-*n* process. In the embodiment of FIG. 1B, the features generated as a result of the feature fusion in the previous operation proceed in the order in which they are input to the feature fusion process in the next operation. For example, when the linguistic feature 12 and the visual feature 22 are input to the feature fusion 30-1, as a result of the feature fusion 30-1, a linguistic feature $F_{V\rightarrow L}$ 13 to which the visual feature is propagated and a visual feature $F_{L\rightarrow V}$ 23 to which the linguistic feature is propagated are generated. The $F_{V\rightarrow L}$ 13 and $F_{L\rightarrow V}$ 23 are input to the feature fusion 30-2 that is the next operation. An output (fused feature) of the last feature fusion 30-*n* is used as the input to the application 40. The output of the last feature fusion 30-*n* may be a plurality of features (for example, the visual feature and the linguistic feature), and all of these features may be used as input to the application 40, and any one of the plurality of features may be used as the input to the application 40**.

As another embodiment of the present invention, the linguistic feature 12 and the visual feature 22 may be used as the input to the visual-linguistic feature fusion method and system 1000 according to the embodiment of the present invention. In this case, the visual-linguistic feature fusion method and system 1000 instead directly performs the feature fusion 30 of the linguistic feature 12 and visual feature 22 given as the input without using the text encoder 11 and the video encoder 21.

FIGS. 2A-2D are diagrams for describing a detailed procedure of the visual-linguistic feature fusion according to the embodiment of the present invention. FIGS. 2A to 2D illustrate various implementation methods **30-*a*, 30-*b*, 30-*c*, and 30-d for the feature fusion 30**.

Figure 2A:
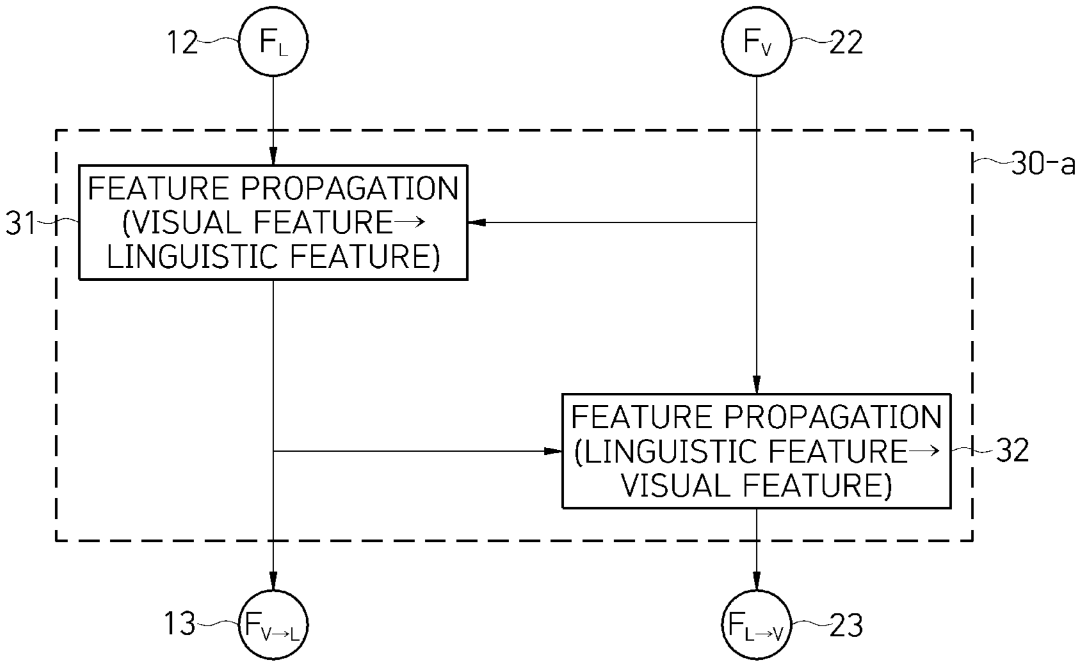
FIGS. 2A-2D are diagrams for describing a detailed procedure of the visual-linguistic feature fusion according to an embodiment of the present invention.

In the embodiment illustrated in FIG. 2A, through feature propagation 31 that propagates the visual feature to the linguistic feature, the visual feature $F_V$ 22 is propagated to the linguistic feature $F_L$ 12, so the "linguistic feature to which the visual feature is propagated" $F_{V\rightarrow L}$ 13 is generated. Through feature propagation 32 that propagates the linguistic feature to the visual feature, the $F_{V\rightarrow L}$ 13 is again propagated to the visual feature $F_V$ 22, so the "visual feature to which the linguistic feature is propagated" $F_{L\rightarrow V}$ 23 is generated. The visual feature $F_V$ 22 may be composed of a plurality of frame features extracted from a plurality of frames sampled from a video. In this case, in the feature propagation 32 process, $F_{V\rightarrow L}$ 13 is propagated to all the plurality of frame features.

Figure 2B:
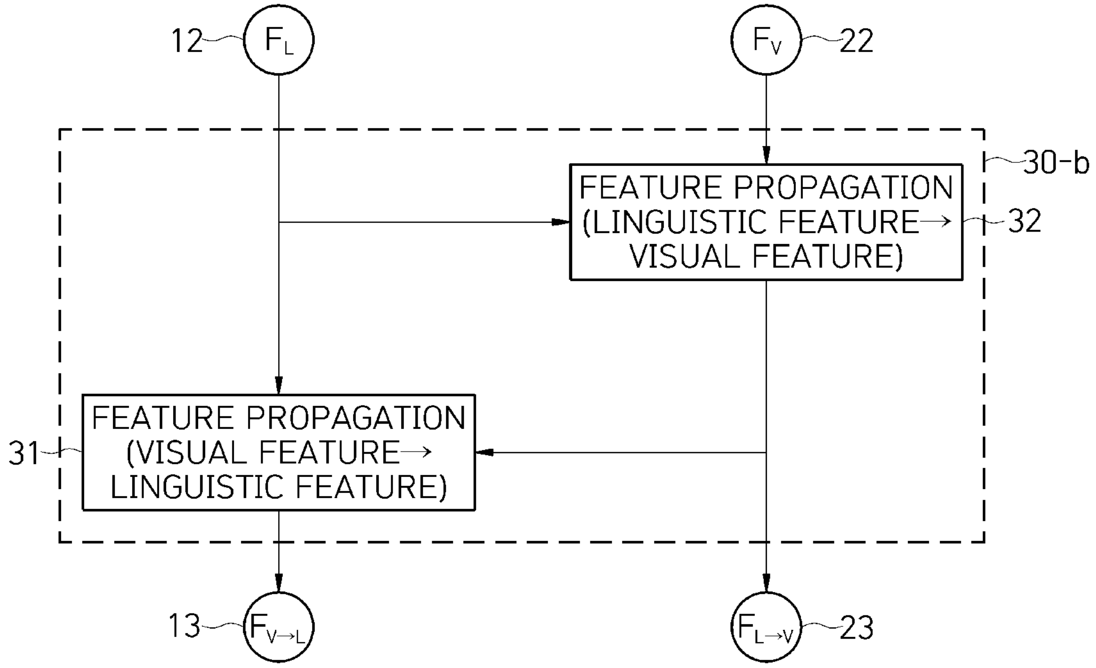

The above-described propagation order can be changed. As illustrated in FIG. 2B, the linguistic feature $F_L$ 12 is first propagated to the visual feature $F_V$ 22, and the "visual feature to which the linguistic feature is propagated" $F_{L\rightarrow V}$ 23 generated as a result of the propagation may be propagated to the linguistic feature $F_L$ 12.

Figure 2C:
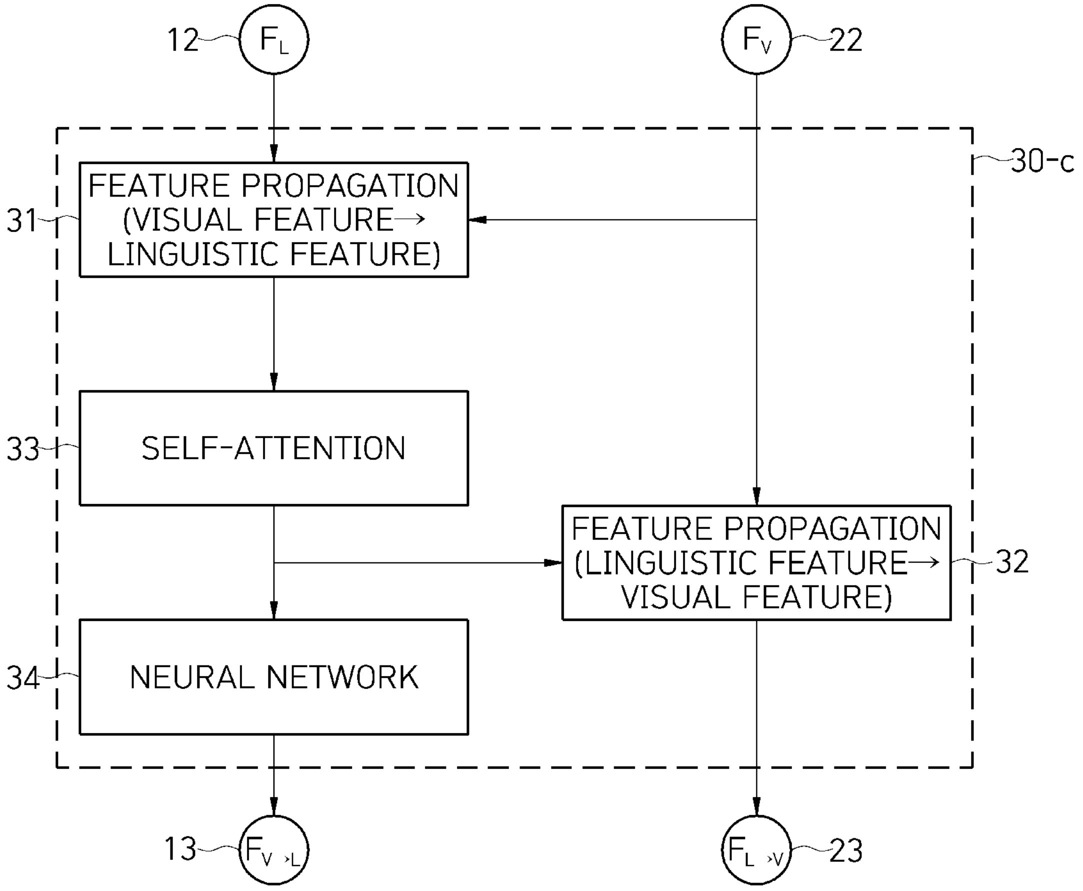

In addition, as illustrated in FIG. 2C, in addition to the propagation between the features, a calculation of self-attention 33 may be performed to advance features within one feature. In the example of FIG. 2C, the visual feature $F_V$ 22 is propagated to the linguistic feature $F_L$ 12 through the feature propagation 31, and the linguistic feature $F_{V>L}$ 13 is generated through the self-attention 33 and a neural network 34. Meanwhile, the linguistic feature that has gone through the self-attention 33 is propagated to the visual feature $F_V$ 22 through the feature propagation 32 to generate the visual feature $F_{L\rightarrow V}$ 23. The self-attention 33 may be performed between the feature propagations 31 and 32 or after the feature propagations 31 and 32, or may be omitted. Meanwhile, when the calculation of the self-attention 33 is added, embedding with better performance is generated, so the computation cost (or computation time) may increase. Accordingly, it may be determined whether to add or omit the self-attention based on the amount of text 10 or video frame 20. For example, the visual-linguistic feature fusion system 1000 may determine whether to add or omit the self-attention based on the amount of either the text 10 or the video frame 20. As another example, the visual-linguistic feature fusion system 1000 may fuse features by selecting any one of the feature fusion methods of FIGS. 2A to 2D and modified feature fusion methods thereof, based on the amount of either the text 10 and the video frame 20. In addition, as illustrated in FIG. 1B, when the feature fusion process includes the plurality of feature fusions 30-1, 30-2, . . . , 30-*n*, all the feature fusions may follow the same feature fusion method, but at least one of each of the feature fusions may take a feature fusion method that is different from other feature fusions.

Figure 2D:
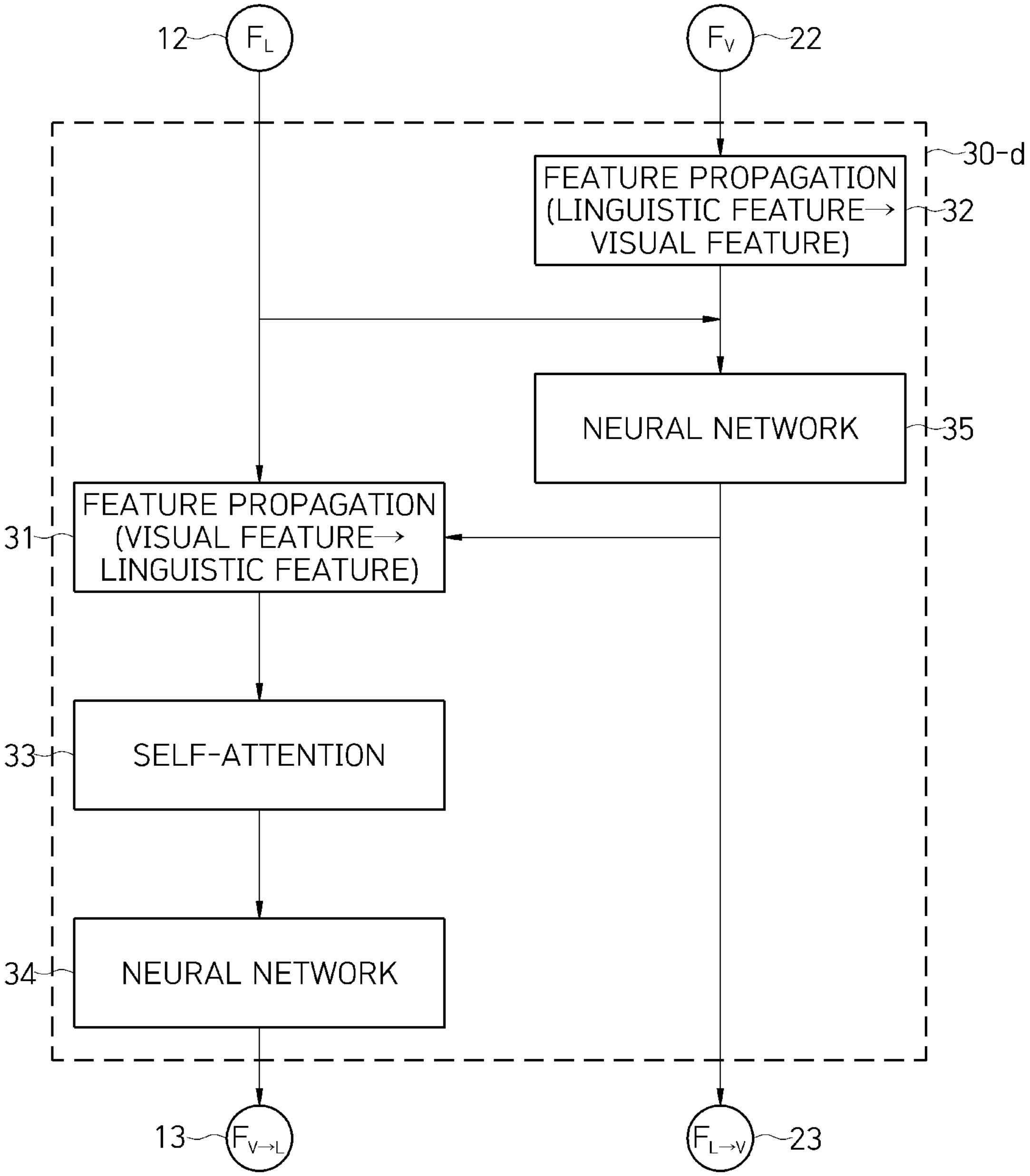

FIG. 2D illustrates an embodiment in which the self-attention 33 is performed after the feature propagation 31, and the feature propagation 32, which propagates the linguistic feature to the visual feature, is performed after the feature propagation 31, which propagates the visual feature to the linguistic feature. In the embodiment of FIG. 2D, the feature propagation 32, which propagates the linguistic feature to the visual feature, is performed first, and the visual feature that has passed the neural network 35 is propagated to the linguistic feature $F_L$ 12. The linguistic feature generated through the feature propagation 31 is converted into the "linguistic feature to which the visual feature is propagated" $F_{V\rightarrow L}$ 13 through the self-attention 33 and the neural network 34. Meanwhile, the neural networks 34 and 35 of FIG. 2D may be configured to include fully-connected layers (FC) and an activation function Gaussian error linear unit (GELU).

Although the detailed procedure of feature fusion 30 has been described above with reference to FIGS. 2A to 2D, various methods may be created by changing the order, changing or deleting calculation elements, adding other calculation elements, etc. For example, in the embodiment of FIG. 2D, a self-attention process may be added between the feature propagation 32 and the neural network 35.

Hereinafter, the calculations of the feature propagation 31 and 32 included in FIGS. 2A to 2D will be described in detail.

The present invention uses the CA of Equation 1 in the feature propagations 31 and 32 process.

$$CA(Q, K, V) = Softmax(QK^T)V \quad \text{[Equation 1]}$$

In Equation 1, a receiving feature (taker) becomes a query Q of the CA, and a giving feature (giver) becomes a key K and a value V of the CA. For example, in the feature propagation 31 process of propagating the visual feature to the linguistic feature, the giving feature (giver) becomes the visual feature, and the receiving feature (taker) becomes the linguistic feature. Therefore, in this case, the linguistic feature, which is the receiving feature (taker), becomes the query Q of the CA, and the visual feature, which is the giving feature (giver), becomes the key K and value V of the CA.

In the cross-attention, the similarity between the query and the key is obtained through an inner product of the query and key, a Softmax function is applied to the inner product of the query and key to calculate a weight, and the calculated weight is multiplied by the value to obtain a result. The reason for using the Softmax function is to give a high weight to similar pairs and a low weight to dissimilar pairs.

By multiplying the value by the weight calculated through the Softmax function in Equation 1, giver features that reflect the similarity between features may be generated. By adding the giver feature to the taker feature, the giver feature and the taker feature may be fused. The feature propagation 31, which propagates the visual feature to the linguistic feature, and the feature propagation 32, which propagates the linguistic feature to the visual feature, may be expressed as Equation 2 and Equation 3, respectively.

$$F_{V\rightarrow L} = F_L + CA(Q(F_L), K(F_V), V(F_V)) \quad \text{[Equation 2]}$$

$$F_{L\rightarrow V} = F_V + CA(Q(F_V), K(F_L), V(F_L)) \quad \text{[Equation 3]}$$

In particular, in the feature propagation 31 (propagating the visual feature to the linguistic feature) expressed in Equation 2, it is preferable to allow information of all frames to be included in the key K and value V Through this, the visual feature that is difficult to share between different frames may be indirectly combined with the linguistic feature. Thereafter, in the process of propagating the linguistic feature to the visual feature, the information combined as above is propagated to each visual feature. In other words, each frame may receive information from other frames.

The visual-linguistic feature fusion may be repeatedly performed by repeating the above-described propagation process one or more times. That is, the feature fusion 30 may be performed repeatedly, and in this case, the output of the feature fusion of the previous operation becomes the input of the feature fusion of the next operation.

In FIGS. 2A to 2D, the output of the final feature fusion (corresponding to 30-*n* in FIG. 1B) is the linguistic feature $F_{V\rightarrow L}$ 13 and the visual feature $F_{L\rightarrow V}$ 23, and all of these features may be input to the application 40 and only one of the two features may be input to the application 40. When two features are input to the application 40, the application 40 generates a vector sequence by serially concatenating the two features. The application 40 inputs the vector sequence to the neural network, and the output of the neural network may be used for the tasks such as the video search or the video question answering. As another example, the application 40 may generate one vector through a pooling process based on the vector sequence, input the generated vector to the neural network, and use the output of the neural network for the tasks such as the video search or the video question answering.

Figure 3:
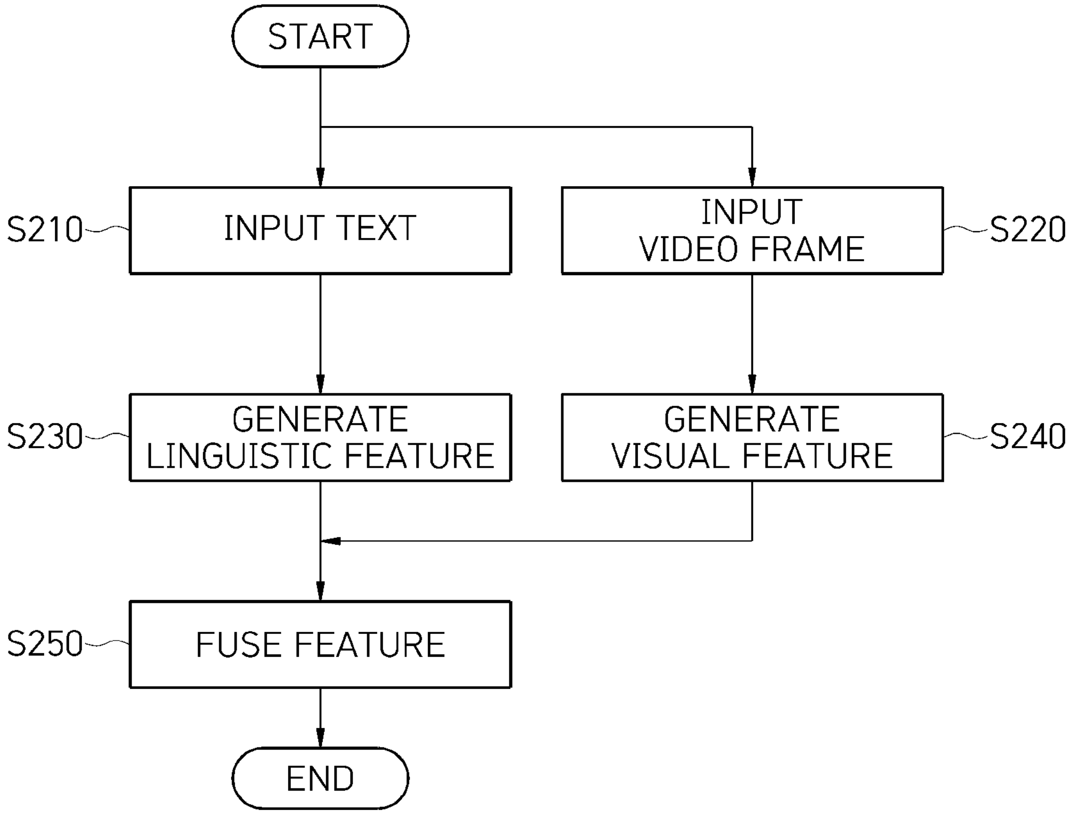
FIG. 3 is a diagram for describing a visual-linguistic feature fusion method according to an embodiment of the present invention.

FIG. 3 is a diagram for describing a visual-linguistic feature fusion method according to an embodiment of the present invention.

Referring to FIG. 3, the visual-linguistic feature fusion method according to an embodiment of the present invention includes operations S210 to S250. The visual-linguistic feature fusion method illustrated in FIG. 3 is according to an embodiment, and the operations of the visual-linguistic feature fusion method according to the present invention are not limited to the embodiment illustrated in FIG. 3, and may be added, changed, or deleted as needed. For example, operations S210 and S220 may be omitted.

For convenience of description, it is assumed that the visual-linguistic feature fusion method according to the embodiment of FIG. 3 is performed by the visual-linguistic feature fusion system 1000.

Operation S210 is a text input operation. The visual-linguistic feature fusion system 1000 receives the text 10 from the outside. Here, the text may be a sentence.

Operation S220 is a video frame input operation. The visual-linguistic feature fusion system 1000 receives the video frame 20 from the outside. Here, the video frame may be a frame sampled from a video.

Operation S230 is a linguistic feature generation operation. The visual-linguistic feature fusion system 1000 generates the linguistic feature 12 using the text encoder 11 based on the text 10. The linguistic feature 12 may have the form of the embedding vector.

Operation S240 is a visual feature generation operation. The visual-linguistic feature fusion system 1000 generates the visual feature 22 using the video encoder 21 based on the video frame 20. The visual feature 22 may have the form of the embedding vector.

Operation S250 is a feature fusion operation. The visual-linguistic feature fusion system 1000 generates the fused feature using the attention technique based on the linguistic feature 12 and the visual feature 22. Specifically, the visual-linguistic feature fusion system 1000 generates the fused feature (linguistic feature $F_{V \to L}$ 13 to which the visual feature is propagated, and visual feature $F_{L \to V}$ 23 to which the linguistic feature is propagated) through the feature fusion 30 by using the CA based on the linguistic feature 12 and the visual feature 22. The visual-linguistic feature fusion system 1000 may generate the fused feature after setting the receiving feature (taker) to the query Q of the CA, setting the giving feature (giver) to the key K and value V of the CA, inputting the inner product of the query Q and key K to the Softmax function to calculate the weight, and multiplying the weight by the value V and then adding the value V multiplied by the weight to the receiving feature.

In addition, the visual-linguistic feature fusion system 1000 may generate the fused feature using both the CA and self-attention. That is, the visual-linguistic feature fusion system 1000 may generate the fused feature (linguistic feature $F_{V \to L}$ 13 to which the visual feature is propagated, and visual feature $F_{L \to V}$ 23 to which the linguistic feature is propagated) through the feature fusion 30 by using both the CA and self-attention based on the linguistic feature 12 and the visual feature 22.

The visual-linguistic feature fusion system 1000 may perform the feature fusion 30 process according to any one of the above-described embodiments of FIGS. 2A to 2D and modified embodiments thereof. In addition, the visual-linguistic feature fusion system 1000 may repeatedly perform the feature fusion 30 process the set number of times n to generate the fused feature. In other words, the visual-linguistic feature fusion system 1000 may repeatedly perform the task of generating new fused features using the attention technique based on the fused feature.

The above-described visual-linguistic feature fusion method was described with reference to the flowchart presented in the drawing. For simplicity, the method has been illustrated and described as a series of blocks, but the invention is not limited to the order of the blocks, and some blocks may occur with other blocks in a different order or at the same time as illustrated and described in the present specification. Also, various other branches, flow paths, and orders of blocks that achieve the same or similar result may be implemented. In addition, all the illustrated blocks may not be required for implementation of the methods described in the present specification.

Meanwhile, in the description with reference to FIG. 3, each operation may be further divided into additional operations or combined into fewer operations according to an implementation example of the present invention. Also, some operations may be omitted if necessary, and an order between operations may be changed. In addition, the contents of FIGS. 1A to 2D may be applied to the contents of FIG. 3 even if other contents are omitted. Also, the contents of FIG. 3 may be applied to the contents of FIGS. 1A and 2D.

Figure 4:
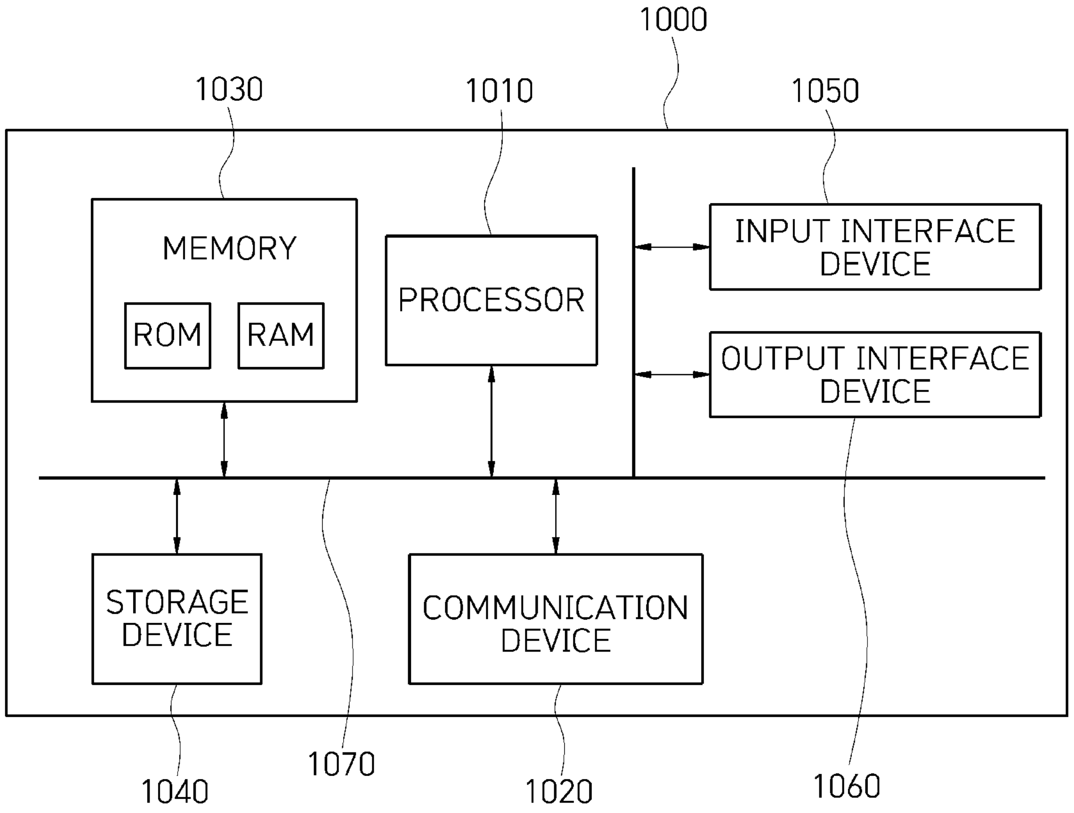
FIG. 4 is a block diagram for describing a configuration of a visual-linguistic feature fusion system according to an embodiment of the present invention.

FIG. 4 is a block diagram for describing a configuration of a visual-linguistic feature fusion system according to an embodiment of the present invention. A visual-linguistic feature fusion system 1000 illustrated in FIG. 4 is a computer system for implementing the above-described visual-linguistic feature fusion method.

Referring to FIG. 4, the visual-linguistic feature fusion system 1000 may include at least one of a processor 1010, a memory 1030, an input interface device 1050, an output interface device 1060, and a storage device 1040 that communicate through a bus 1070. The visual-linguistic feature fusion system 1000 may further include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In the embodiment of the present disclosure, the memory may be located inside or outside the processing unit, and the memory may be connected to the processing unit through various known means. The memory may be various types of volatile or non-volatile storage media, and the memory may include, for example, a ROM or a RAM.

Accordingly, the embodiment of the present invention may be implemented as a computer-implemented method, or as a non-transitory computer-readable medium having computer-executable instructions stored thereon. In one embodiment, when executed by the processing unit, the computer-readable instructions may perform the method according to at least one aspect of the present disclosure.

The communication device 1020 may transmit or receive a wired signal or a wireless signal.

In addition, the method according to the embodiment of the present invention may be implemented in the form of program instructions that may be executed through various computer means and may be recorded in a computer-readable recording medium.

The computer-readable recording medium may include a program instruction, a data file, a data structure or the like, alone or a combination thereof. The program instructions recorded in the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include magnetic media such as a hard disk, a floppy disk, and a magnetic tape, optical media such as a compact disk read only memory (CD-ROM) or a digital versatile disk (DVD), magneto-optical media such as a floptical disk, a ROM, a RAM, a flash memory, or the like. Examples of the program instructions may include a high-level language code capable of being executed by a computer using an interpreter, or the like, as well as a machine language code made by a compiler.

The memory 1030 stores computer-readable instructions, and at least one processor 1010 is implemented to execute the instructions.

By executing the above instructions, the processor 1010 may be configured to generate the linguistic feature using the text encoder based on the text, generate the visual feature using the video encoder based on the video frame, and generate the fused feature of the linguistic feature and the visual feature using the attention technique based on the linguistic feature and the visual feature. The fused feature may include the linguistic feature generated by propagating the visual feature to the linguistic feature, and the visual feature generated by propagating the linguistic feature to the visual feature.

The attention technique includes the cross-attention and may further include the self-attention.

The processor 1010 may be configured to additionally perform the operation of generating new fused features using the attention technique based on the fused feature. The processor 1010 may perform the cross-attention after setting one of the linguistic and the visual features as a giving feature, setting the other feature as a receiving feature, setting the receiving feature as a query of the cross-attention, and setting the giving feature as a key and a value of the cross-attention. In this case, the processor 1010 generates the fused feature by inputting the inner product of the query and the key to the Softmax function to calculate the weight, and multiplying the calculated weight by the value and then adding the value multiplied by the weight to the receiving feature.

The existing general feature fusion method simply connects the visual features and linguistic features and then performs the self-attention to fuse the features. Performing the method requires the computation amount proportional to the square of the length of the connected sequence. Specifically, when the length of the linguistic feature is L and the length of the visual feature is V, the computation cost proportional to $(V+L)^2$ is required.

On the other hand, the feature fusion method and system according to an embodiment of the present invention fuse the features using the cross-attention. Since the cross-attention has the computation amount proportional to the product of the lengths of two sequences, when the length of the linguistic feature is L and the length of the visual feature is V, the computation cost proportional to VL is required. When the features are fused using the two cross-attentions, the computation cost is proportional to 2VL. Therefore, the feature fusion method and system according to an embodiment of the present invention requires a significantly smaller computation cost, compared to $(V+L)^2=V^2+2VL+L^2$ which is the computation cost of the existing feature fusion method.

In addition, as illustrated in Table 1, the method and system ('Ours' in Table 1) according to an embodiment of the present invention shows better performance compared to the existing fusion methods in the sentence-based video search.

TABLE 1

| Method | R@1 | R@5 | R@10 | meanR |
|---|---|---|---|---|
| ClipBERT | 22.0 | 46.8 | 59.9 | 42.9 |
| HERO | 20.5 | 47.6 | 60.9 | 43.0 |
| MMT | 26.6 | 57.1 | 69.6 | 51.1 |
| FiT | 31.0 | 59.5 | 70.5 | 53.7 |
| AlignPrompt | 33.9 | 60.7 | 73.2 | 55.9 |
| Singularity | 36.8 | 65.9 | 75.5 | 59.4 |
| Ours | 41.5 | 67.8 | 76.6 | 62.0 |

Effects which can be achieved by the present invention are not limited to the above-described effects. That is, other objects that are not described may be obviously understood by those skilled in the art to which the present invention pertains from the above detailed description.

Although exemplary embodiments of the present invention have been disclosed above, it may be understood by those skilled in the art that the present invention may be variously modified and changed without departing from the scope and spirit of the present invention described in the following claims.

What is claimed is:

1. A visual-linguistic feature fusion method comprising:
generating a linguistic feature using a text encoder based on text, wherein the linguistic feature is a linguistic embedding vector;
generating a visual feature using a video encoder based on a video frame, wherein the visual feature is a visual embedding vector; and
generating a fused feature of the linguistic feature and the visual feature using an attention technique based on the linguistic feature and the visual feature, wherein the attention technique includes cross-attention, wherein the fused feature includes the linguistic feature generated by propagating the visual feature to the linguistic feature and the visual feature generated by propagating the linguistic feature to the visual feature,
wherein, by the propagating of the visual feature to the linguistic feature and the propagating of the linguistic feature to the visual feature, information among the plurality of frame features is shared indirectly through the linguistic feature.

2. The visual-linguistic feature fusion method of claim 1, wherein the attention technique includes cross-attention and self-attention.

3. The visual-linguistic feature fusion method of claim 1, wherein the generating of the fused feature includes generating a new fused feature using the attention technique based on the fused feature.

4. The visual-linguistic feature fusion method of claim 1, wherein, in the generating of the fused feature, the cross-attention is performed after setting one of the linguistic feature and the visual feature as a giving feature, setting the other feature as a receiving feature, setting the receiving feature as a query of the cross-attention, and setting the giving feature as a key and a value of the cross-attention.

5. The visual-linguistic feature fusion method of claim 4, wherein, in the generating of the fused feature, the fused feature is generated by inputting an inner product of the query and the key to a Softmax function to calculate a weight and multiplying the calculated weight by the value and then adding the value multiplied by the weight to the receiving feature.

6. A visual-linguistic feature fusion system comprising:
a memory configured to store computer-readable instructions; and at least one processor configured to execute the instructions, wherein the at least one processor is configured to execute the instructions to generate a linguistic feature using a text encoder based on text, wherein the linguistic feature is a linguistic embedding vector, generate a visual feature using a video encoder based on a video frame, wherein the visual feature is a visual embedding vector, and generate a fused feature of the linguistic feature and the visual feature using an attention technique based on the linguistic feature and the visual feature, wherein the attention technique includes cross-attention, wherein the fused feature includes the linguistic feature generated by propagating the visual feature to the linguistic feature and the visual feature generated by propagating the linguistic feature to the visual feature, wherein, by the propagating of the visual feature to the linguistic feature and the propagating of the linguistic feature to the visual feature, information among the plurality of frame features is shared indirectly through the linguistic feature.

7. The visual-linguistic feature fusion system of claim 6, wherein the attention technique includes cross-attention and self-attention.

8. The visual-linguistic feature fusion system of claim 6, wherein the at least one processor is configured to additionally perform an operation of generating a new fused feature using an attention technique based on the fused feature.

9. The visual-linguistic feature fusion system of claim 6, wherein the at least one processor is configured to perform the cross-attention after setting one of the linguistic feature and the visual feature as a giving feature, setting the other feature as a receiving feature, setting the receiving feature as a query of the cross-attention, and setting the giving feature as a key and a value of the cross-attention.

10. The visual-linguistic feature fusion system of claim 9, wherein the at least one processor generates the fused feature by inputting an inner product of the query and the key to a Softmax function to calculate a weight and multiplying the calculated weight by the value and then adding the value multiplied by the weight to the receiving feature.

* * * * *